(12) United States Patent
Helie et al.

(10) Patent No.: US 8,539,355 B2
(45) Date of Patent: Sep. 17, 2013

(54) AUDIO/VIDEO EDITING NODE PROCESSING AND MANIPULATION

(75) Inventors: Martin Helie, Laval (CA); Alain Compagnat, Ste-Julie (CA)

(73) Assignee: Autodesk, Inc., San Rafael, CA (US)

( * ) Notice: Subject to any disclaimer, the term of this patent is extended or adjusted under 35 U.S.C. 154(b) by 1879 days.

(21) Appl. No.: 11/107,433

(22) Filed: Apr. 15, 2005

(65) Prior Publication Data
US 2006/0236256 A1    Oct. 19, 2006

(51) Int. Cl.
*G06F 3/00* (2006.01)
*G06F 3/048* (2013.01)
*G06F 3/16* (2006.01)

(52) U.S. Cl.
USPC ........... 715/723; 715/719; 715/726; 715/730; 715/810; 715/837

(58) Field of Classification Search
USPC .......................................................... 715/810
See application file for complete search history.

(56) References Cited

U.S. PATENT DOCUMENTS

| | | | |
|---|---|---|---|
| 5,404,316 A * | 4/1995 | Klingler et al. | 715/723 |
| 5,490,246 A * | 2/1996 | Brotsky et al. | 715/763 |
| 5,892,506 A * | 4/1999 | Hermanson | 715/500.1 |
| 6,873,344 B2 * | 3/2005 | Samra et al. | 715/723 |
| 6,948,128 B2 * | 9/2005 | Ibrahim et al. | 715/723 |
| 2007/0143697 A1 * | 6/2007 | Muller et al. | 715/764 |

OTHER PUBLICATIONS

Hirakawa, Masahito and Ichikawa, Tadao, Visual Programming—Toward Realization of User-Friendly Programming Environments, 1987, EEE Computer Society Press, Proceedings of the 1987 Fall Joint Computer Conference on Exploring technology: today and tomorrow, pp. 129-137.*

* cited by examiner

*Primary Examiner* — Matt Kim
*Assistant Examiner* — Yongjia Pan
(74) *Attorney, Agent, or Firm* — Gates & Cooper LLP (57) ABSTRACT

A method, apparatus, and article of manufacture provide the ability to display information and obtain a custom node in a procedural renderer. A schematic view of a flow of clip image data, wherein a node in the schematic view represents an operator/function performed on or that affects another node or a particular layer of the clip image data is displayed. Two or more nodes are selected and grouped together. The schematic view is then altered to reflect the grouping of the selected nodes. Further, the selected node may be associated with a custom node bin, wherein the custom node bin represents a custom node that can be used in a schematic work area of the procedural renderer as often as desired.

24 Claims, 7 Drawing Sheets

AUDIO/VIDEO EDITING NODE PROCESSING AND MANIPULATION

BACKGROUND OF THE INVENTION

1. Field of the Invention

The present invention relates generally to image/video display and processing systems, and in particular, to a method, apparatus, and article of manufacture for conducting clip operations as part of a group.

2. Description of the Related Art

When processing audio/video data, a series of tasks may be performed on the data. Each task/function may be viewed as a node in a process tree. Clips may be connected with nodes and the result of one node may be viewed as the source for the next node. However, with extensive operations, the process tree may be extremely large, with nodes too numerous to effectively view and manipulate. Further, prior art methodologies require the user to utilize a single node per operation. In this regard, to apply more than one node to a clip (or to multiple clips), the user must manually connect each clip and node. These problems may be better understood by describing prior art process trees and nodes.

Operators, tasks, or functions may perform a variety of functions with respect to a clip or source. For example, an operator may perform compositing, painting, color correction, degraining, blurring, etc. Such operators may be viewed schematically on a per-layer basis.

Figure 1:
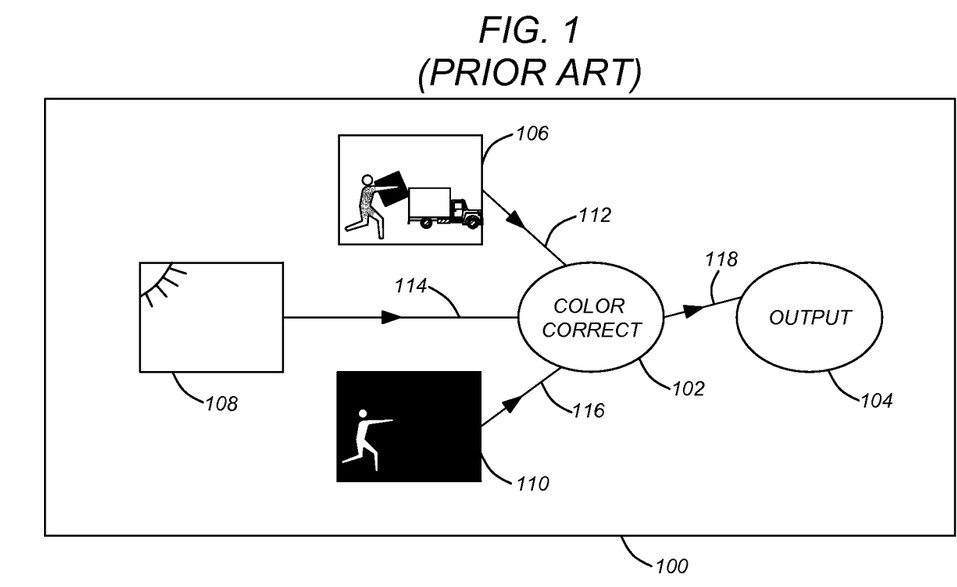
FIG. 1 illustrates a process tree in a schematic view.

FIG. 1 illustrates a process tree in a schematic view. A schematic view 100 uses node(s) 102-104 to represent all of the operators in a workspace performed on one or more clips 106-110, and line(s) (edges) 112-118 between nodes clips 106-110 and nodes 102-104 to indicate the flow of image data between the operators. The output of one node 102 is the source for the next node 104. As a result clip 104 or other branch (e.g., paint or color correction projects 102) is created, the process tree indicating the flow of data through the nodes 102-104 is built automatically. As illustrated in FIG. 1, various source nodes in the form of clips 106-110 are utilized. As illustrated, front clip 106, back clip 108, and matte clip 110 may be utilized by color correction node 102. The color correction node 102 performs an operation (i.e., a color correction to the clips 106-110) on the clips 106-110 to produce a result/output 104.

As used herein, an operator (e.g., color correction operator 102) is the most common node. Alternative nodes may be used to connect two nodes. The process tree (such as the process tree illustrated in FIG. 1) can be used to manage operators and nodes. For example, users may add operators (e.g., a paint operation) to a branch, change the process order of operators 102-104, and navigate easily between operator controls. Further, if an operator is added to a layer in a schematic view 100, the operator will appear as a node (e.g., the color correct node 102). The same operator node may also appear in other workspace environments (e.g., a workspace panel). Further, in the schematic view, particular operators may be turned on/off as desired simply by clicking on the icon for that operator.

While the above prior art schematic view 100 and operations may be used to modify and edit an image/clip, the prior art has many limitations. For example, as described above, a complex process tree may involve hundreds of nodes and clips. Viewing and working with such large numbers of nodes and clips is often difficult if not impossible to navigate. In addition, a user may perform a sequence of operations and apply the sequence to a clip. The user may also desire to apply the same sequence to another clip. However, in the prior art, the user is forced to duplicate each sequence and manually link the sequence to the new clip. Such an editing approach is cumbersome and inefficient.

In view of the above, what is needed is flexibility with respect to viewing and manipulating nodes/operators in a schematic view.

SUMMARY OF THE INVENTION

Image data in the prior art may be processed through the use of a process tree that is displayed schematically in a procedural renderer. However, the prior art procedural renderers may have a cluttered workspace and are not flexible.

To overcome the disadvantages of the prior art, embodiments of the present invention allow the user to group nodes together in the schematic view. Once grouped, the user can define how and which nodes are displayed as part of the group contents.

In addition, embodiments of the invention also provide the ability to create a custom node that may be used multiple times to perform the same task. To create the custom node, one or more nodes may simply be associated with (e.g., dragged and dropped) a bin. The bin may be further associated with a particular user or may be exposed to all users. The bin may then be viewed as a single custom node that can be placed anywhere as often as desired by the user.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 2:
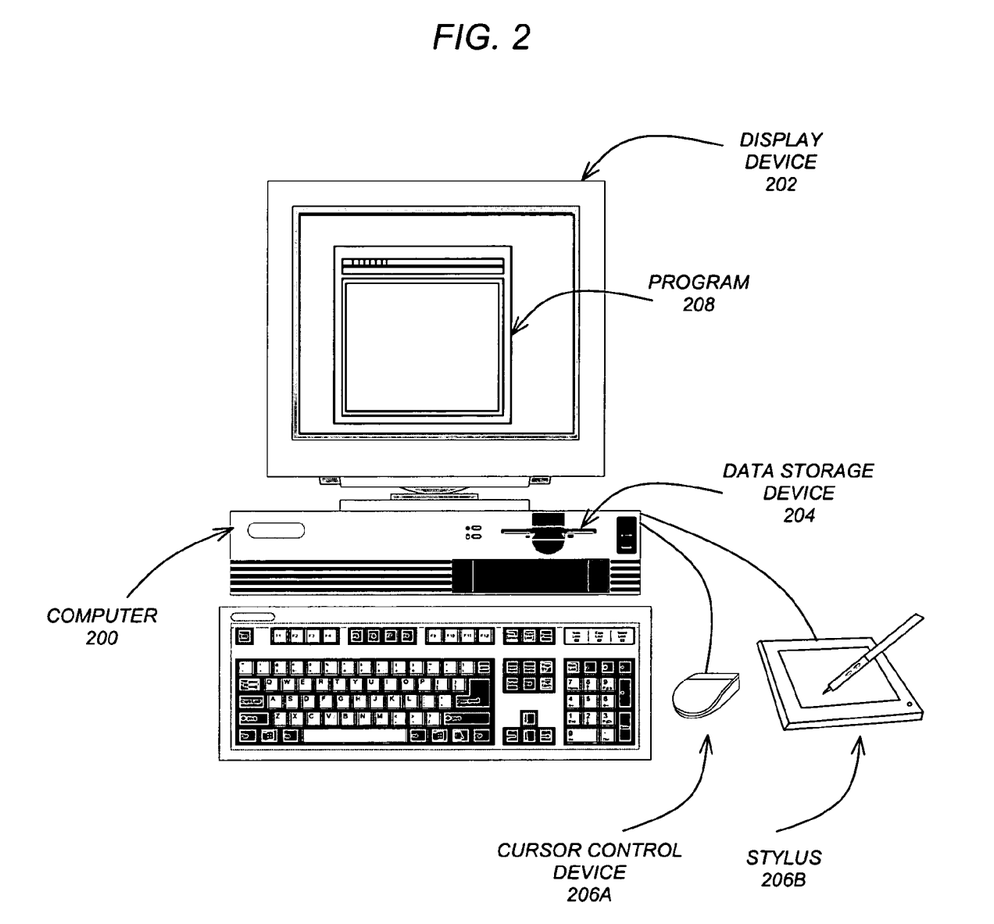
FIG. 2 is an exemplary hardware and software environment used to implement one or more embodiments of the invention.

FIG. 2 is an exemplary hardware and software environment used to implement one or more embodiments of the invention. Embodiments of the invention are typically implemented using a computer 200, which generally includes, inter alia, a display device 202, data storage device(s) 204, cursor control devices 206A, stylus 206B, and other devices. Those skilled in the art will recognize that any combination of the above components, or any number of different components, peripherals, and other devices, may be used with the computer 200.

One or more embodiments of the invention are implemented by a computer-implemented program 208. Such a program may be a procedural renderer (i.e., an application that provides the ability to edit operators in a schematic view), a paint application, a media player, a video editing program, an effects program, compositing application, or any type of program that executes on a computer 200. The program 208 may be represented by a window displayed on the display device 202. Generally, the program 208 comprises logic and/or data embodied in or readable from a device, media, carrier, or signal, e.g., one or more fixed and/or removable data storage devices 204 connected directly or indirectly to the computer 200, one or more remote devices coupled to the computer 200 via a data communications device, etc. In addition, program 208 (or other programs described herein) may be an object-oriented program having objects and methods as understood in the art.

Figure 3:
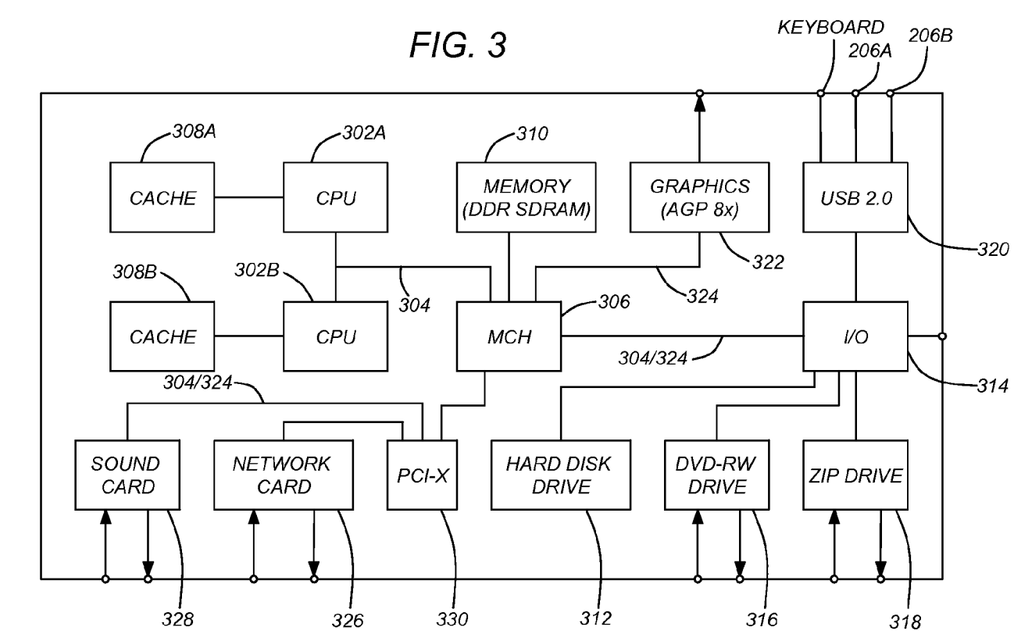
FIG. 3 illustrates detailed components of the hardware of FIG. 2 in accordance with one or more embodiments of the invention.

The components of computer system 200 are further detailed in FIG. 3 and, in the preferred embodiment of the present invention, said components are based upon the Intel® E7505 hub-based chipset.

The system 200 includes two Intel® Pentium™ Xeon™ DP central processing units (CPU) 302A, 302B running at three Gigahertz, that fetch and execute instructions and manipulate data via a system bus 304 providing connectivity with a Memory Controller Hub (MCH) 306. CPUs 302A, 302B are configured with respective high-speed caches 308A, 308B comprising at least five hundred and twelve kilobytes, which store frequently-accessed instructions and data to reduce fetching operations from a larger memory 310 via MCH 306. The MCH 306 thus co-ordinates data flow with a larger, dual-channel double-data rate main memory 310, that is between two and four gigabytes in data storage capacity and stores executable programs which, along with data, are received via said bus 304 from a hard disk drive 312 providing non-volatile bulk storage of instructions and data via an Input/Output Controller Hub (ICH) 314. The I/O hub 314 similarly provides connectivity to DVD-ROM readwriter 316 and ZIP™ drive 318, both of which read and write data and instructions from and to removable data storage media. Finally, I/O hub 314 provides connectivity to USB 2.0 input/output sockets 320, to which the stylus and tablet 206B combination, keyboard, and mouse 206A are connected, all of which send user input data to system 200.

A graphics card 322 receives graphics data from CPUs 302A, 302B along with graphics instructions via MCH 306. The graphics card 322 may be coupled to the MCH 306 through a direct port 324, such as the direct-attached advanced graphics port 8X (AGP 8X) promulgated by the Intel® Corporation, the bandwidth of which exceeds the bandwidth of bus 304. The graphics card 322 may also include substantial dedicated graphical processing capabilities, so that the CPUs 302A, 302B are not burdened with computationally intensive tasks for which they are not optimized.

Network card 326 provides connectivity to a framestore by processing a plurality of communication protocols, for instance a communication protocol suitable to encode and send and/or receive and decode packets of data over a Gigabit-Ethernet local area network. A sound card 328 is provided which receives sound data from the CPUs 302A, 302B along with sound processing instructions, in a manner similar to graphics card 322. The sound card 328 may also include substantial dedicated digital sound processing capabilities, so that the CPUs 302A, 302B are not burdened with computationally intensive tasks for which they are not optimized. Network card 326 and sound card 328 may exchange data with CPUs 302A, 302B over system bus 304 by means of Intel®'s PCI-X controller hub 330 administered by MCH 306.

Those skilled in the art will recognize that the exemplary environment illustrated in FIGS. 2 and 3 are not intended to limit the present invention. Indeed, those skilled in the art will recognize that other alternative environments may be used without departing from the scope of the present invention.

Software Environment

As described above, a software application 208 such as a procedural renderer (that permits the viewing of the different paint operations schematically) may execute on computer 200. When working in the schematic view 100, users may modify the process tree and individual nodes prior to producing the output 104. When the user is ready to generate a final clip or an intermediate result, the user selects a process button (not shown). Once selected, all process trees in the schematic 100 are processed and one clip is written to the destination specified by each output node 104. The process of generating the final clip or intermediate result is referred to as rendering. Accordingly, the software program 208 that displays a schematic view 100 may also be referred to as a procedural renderer.

Grouping Nodes

As described above, schematic views 100 may be cumbersome and complex and the number of nodes and clips expands. To simplify cluttered schematics 100, one or more embodiments of the invention provide the ability to group nodes. When nodes 102 are grouped, they collapse into one group node that can be used as a parent to, or child of, other clips and nodes. A group may be represented by a single node that displays the group contents, inputs, and outputs.

Figure 4:
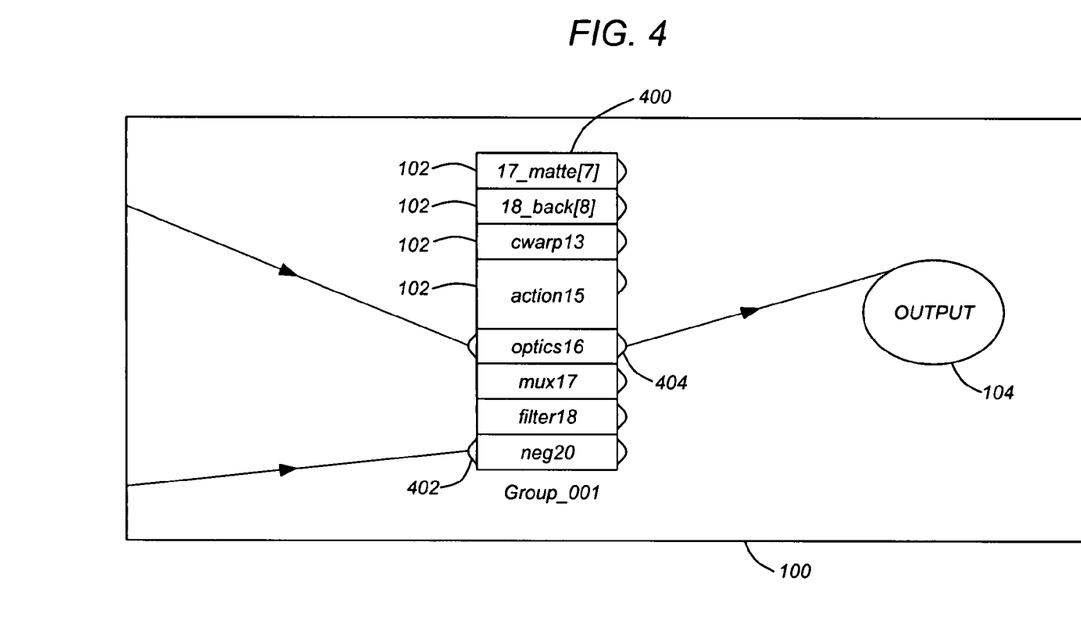
FIG. 4 illustrates group node in accordance with one or more embodiments of the invention.

FIG. 4 illustrates group node in accordance with one or more embodiments of the invention. As shown, multiple nodes 102 are grouped together into the single group node 400. Once grouped, each node 102 collapses into the group 400 that contains a list of the nodes in the group 400. In this regard, the group node 400 lists the nodes contained in the group 400, as well as the non-hidden input tabs 402 and non-hidden output tabs 404.

Several groups can be created and organized in a schematic 100. Users may then work on individual groups 400. For example, a Keying and Color Correction branch may be grouped separately from an Action and filtering branch, wherein each branch can be worked on independently of the other. To edit the nodes 102 in a group 400, the group 400 can be expanded and necessary modifications may be performed.

A group 400 may also be viewed as a dynamic node 102 that can be customized (e.g., using a defined menu). For example, a customization menu may list all of the nodes 102 and connections 402-404 contained in a group 400. The customization menu may allow a user to rename or hide particular nodes 102/connections 402-404 in a group 400. In addition, it may be possible to define which input and output connection sockets 402-404 are visible and available for connection in the schematic 100. As illustrated in FIG. 4, the non-hidden input 402 and output 404 tabs are illustrated.

A group 400 may be easily created. To create a group, one or multiple nodes 102 are selected (e.g., by using a mouse 206A or stylus 206B to draw a box around the desired nodes (e.g., using a CTRL-drag operation)). Nodes may be identified as part of a selection by displaying the selected nodes 102 differently. For example, selected nodes 102 may be highlighted or outlined in white. Once selected, a menu/button option may be activated to group the selected nodes 102 thereby collapsing the selected nodes 102 into a group 400. Groups 400 may also be created inside a group 400. Once collapsed (or when performing the grouping), the user may also have the ability to enter a name for the group which may be shown in the schematic view 100 (e.g., Group_001).

Once grouped, the entire group 400 may be edited. In this regard, when editing a group 400, the group 400 may appear in an isolated schematic 100 as illustrated in FIG. 4. Individual nodes 102 within the group 400 can be edited or all/a portion of the nodes 102 may be edited as a group. In addition, the order of the nodes 102 within the group may be manipulated.

Figure 5:
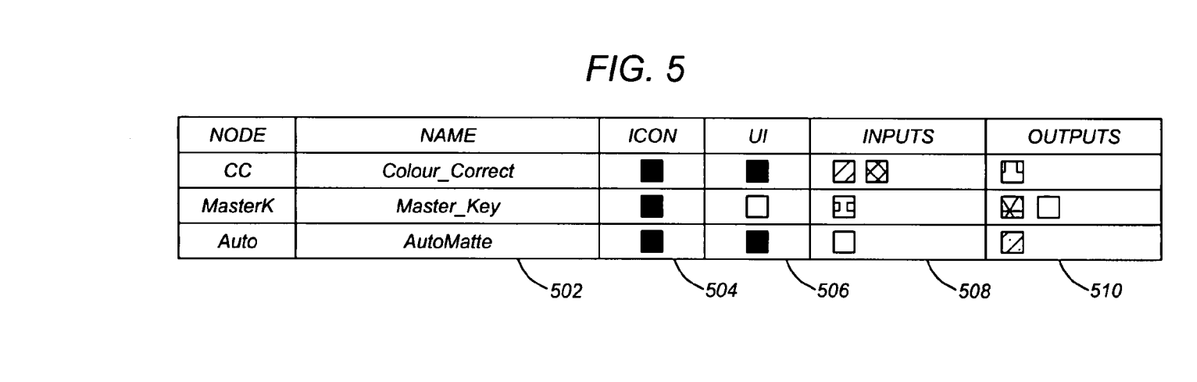
FIG. 5 illustrates a menu that provides the ability to modify a group's display settings in accordance with one or more embodiments of the invention.

To allow flexibility in a cluttered schematic 100, the user may also have the ability to modify the manner in which a group 400 is displayed. Accordingly, the user can elect to customize the group 400 display settings. FIG. 5 illustrates a menu that provides the ability to modify a group's display settings in accordance with one or more embodiments of the invention. The menu 500 displays the name 502 for each node 102 in the group 400. The name 502 may be changed as desired by the user. Additionally, individual node display properties 504-510 may be toggled on/off. As illustrated in FIG. 5, filled boxes indicate the property 504-510 is enabled while an unfilled box indicates the property is disabled.

Icon property 504 toggles a node's 102 visibility within the group 400. UI (user interface) property 506 toggles the node's 102 availability in a node list box (e.g., for selection as an input or output). Input property 508 hides or unhides the selected node's input sockets 402. Output property 510 hides or unhides the selected node's output sockets 404. Input sockets 402 and 404 may also be color coded in accordance with particular node uses. Selecting the color in the menu (e.g., by selecting the boxes 508-510) will result in exposing or not exposing a socket in the group 400. Colors of sockets may be defined by the nature of the sockets. For instance, in a compositing node, a front socket may be red, a back socket may be green, a matte socket may be blue, a comp output socket may be yellow, and a matte output may be blue. Such color coding may be used when listing the different sockets in the menu 508-510.

Thus, as described herein, nodes 102 may be grouped together and flexibility is provided to the user by allowing the user to define which elements of the group 400 are visible/hidden/available. For example, particular nodes 102/interfaces that are part of a group 400 may be hidden. In this regard, a user can define which nodes 102 are listed/viewable as part of the contents of a group 400. Thus, the user can completely define what is exposed to a user as group 400 contents including inputs 402 and outputs 404. In this regard, the user may desire to group a single node (e.g., having five (5) inputs and two (2) outputs) and thereafter customize the icon to see only one input and out output.

In addition, once a group 400 is obtained, the user may examine the list of nodes 102 in a group 400 and select a particular node 102 from the list for editing. Such node 102 selection capability may be performed without finding and selecting a node 102 in a cluttered schematic 100. Thus, rather than viewing the nodes 102 schematically 100, the user may have the option of viewing the various groups 400 and the nodes 102 within each group 400 in a list or hierarchical type format. The nodes 102 within each group may be listed in such a display simultaneously with a group 400 identifier or may be displayed once a particular group 400 is selected or expanded in a view (thereby exposing the contents of the group 400).

Custom Nodes

In addition to customizing the display using groups 400, one or more embodiments of the invention may utilize custom nodes 102. A custom node is essentially a bin that can contain one or more elements/nodes. Nodes 102, groups 400, branches, and entire process trees may be dragged/assigned to a custom node bin to create a custom node. Alternatively, a custom node may consist of a single node 102 that a user intends to use frequently (e.g., a color corrector), or a multitude of nodes that create an effect (e.g., a keyer node parented to an action node with layers connected to a Gmask node). The newly created custom node can be pulled out of the node bin and into a schematic work area to be used anywhere as often as the user desires.

Figure 6:
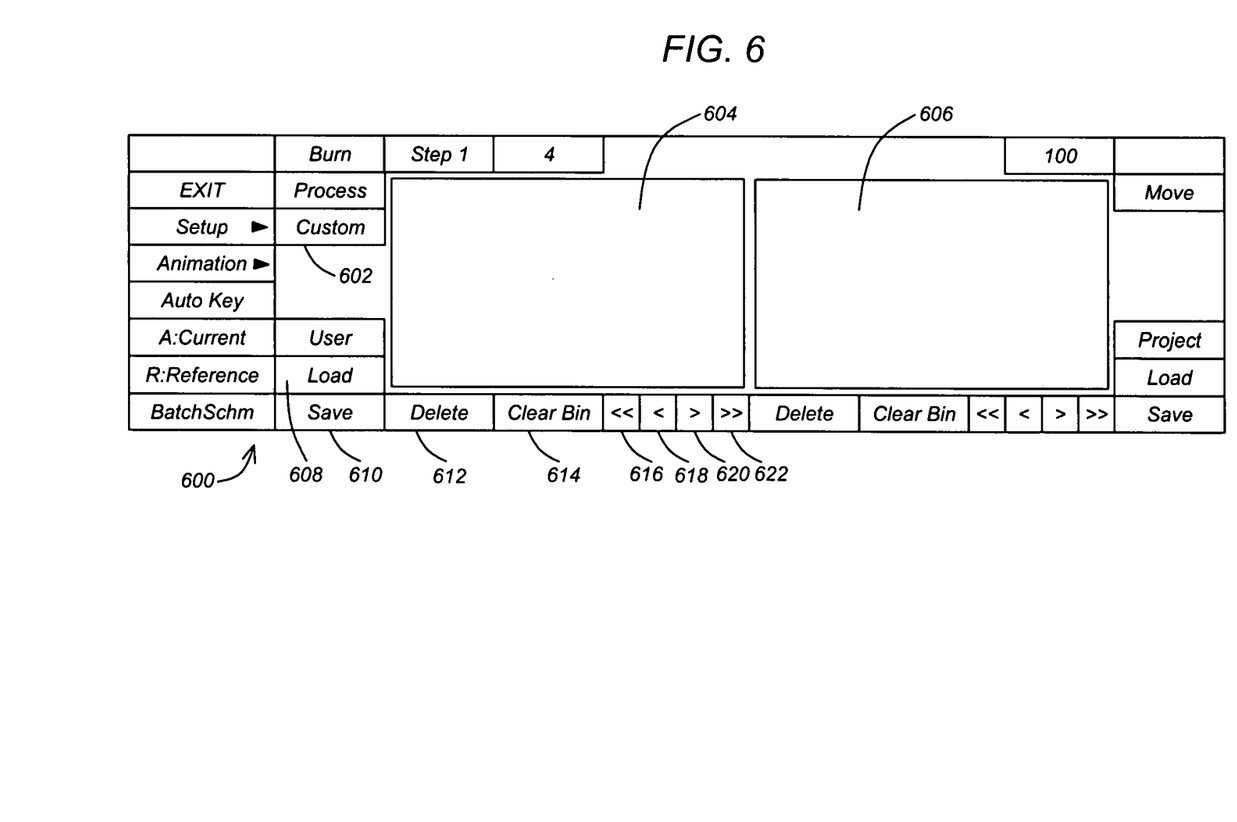
FIG. 6 illustrates a setup-screen that may be used to create and work with custom node/node bins in accordance with one or more embodiments of the invention.

FIG. 6 illustrates a setup-screen that may be used to create and work with custom node/node bins. To create a custom node, the user merely needs to select the custom button 602 from the setup menu 600. Thereafter, a custom node bin 604-606 appears (in addition to buttons 608-622) that can be used to manipulate the custom node bin. As illustrated in FIG. 6, two custom node bins 604 and 606 are displayed. Custom node bin 604 contains user custom nodes (i.e., nodes for the current user) while custom node bin 606 contains project custom nodes (i.e., nodes that are available to all users working on the same/common project). To add an element into a particular custom node bin 604-606, the user can simply select a clip, node, branch, tree, or group from a schematic view 100 and drag and drop the selection to the appropriate custom node bin 604-606.

The various buttons 608-622 may be used to manage each custom node bin. The load button 608 allows the user to load custom nodes from another project or user. The save button 610 saves the current custom nodes so they can be loaded by another project or user. The delete button 612 deletes the selected custom node. The clear bin button 614 deletes all custom nodes in the node bin. Embodiments may also require confirmation for such a multiple deletion. Multiple different custom nodes may be created and the user can scroll through the different custom node bins using arrows 616-622. In this regard, the arrow buttons 616-622 allow the user to reposition custom nodes in a bin 604-606. The single arrow buttons 618-620 advance one node at a time while the double arrow buttons 616 and 622 advance to the first or last custom node.

To use the custom node, a node 102 is selected from one of the bins 604-606. Thereafter, the selected node can be dragged and dropped into a schematic work area. Accordingly, a custom node can be used as often as desired. Further, each time another instance of a custom node is dropped into a schematic work area 100, that instance is given a new name and/or number.

In view of the above, embodiments of the invention provide the ability to drag a node 102 into a large bin 604-606 and thereafter apply the bin to multiple clips 106-110. Thus, the customized node bin 604-606 allows multiple nodes to be combined while providing flexibility to manipulate and remove nodes 102 from the bin as desired.

Logical Flow

Figure 7:
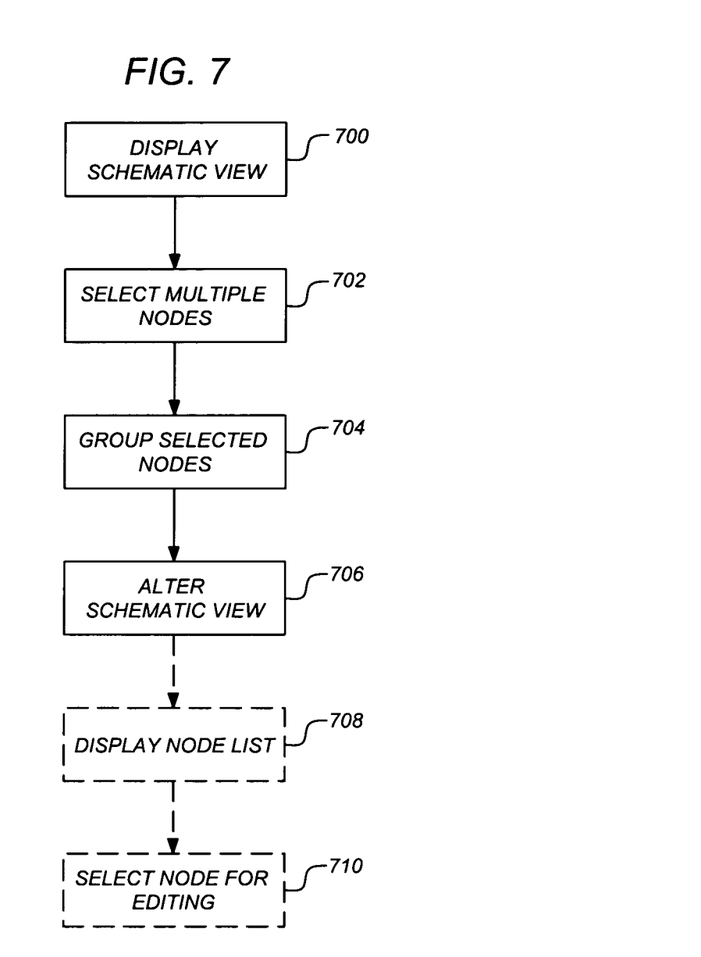
FIG. 7 is a flow chart that illustrates the grouping of nodes in accordance with one or more embodiments of the invention.
Figure 8:
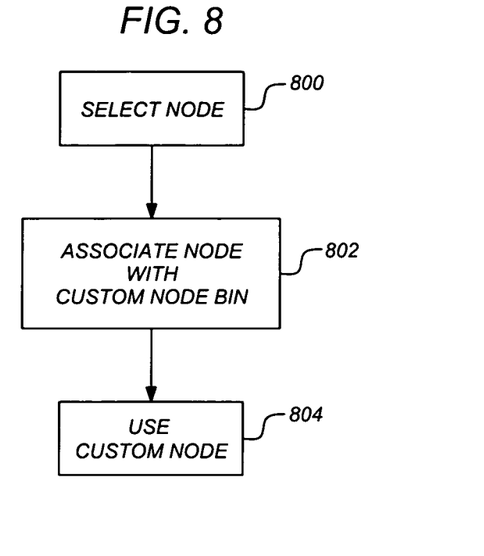
FIG. 8 illustrates a method for obtaining and working with a custom node in accordance with one or more embodiments of the invention.

The above description sets forth the various features available in accordance with the invention. FIGS. 7 and 8 set forth the logical flow for implementing methods in accordance with one or more embodiments of the invention.

FIG. 7 is a flow chart that illustrates the grouping of nodes in accordance with one or more embodiments of the invention. At step 700, a schematic view of a flow of clip image data is displayed. Each node in the schematic view represents an operator performed on a particular layer of the clip image data. At step 702, multiple (e.g., two or more) nodes are selected. At step 704, the selected nodes are grouped into a group.

At step 706, the schematic view is altered to reflect the grouping of the selected nodes. Such an altered view may comprise a collapsing of the selected nodes into a group wherein the display of the group consumes less space in the schematic view than the display of the selected nodes without grouping.

Further, the altered view may be established in accordance with user settings. For example, the user may provide display settings for display properties of one or more nodes in the group (that are reflected in the schematic view). Such display properties may include one or more of the following: an icon property that determines a selected node's visibility within a group, a user interface property that determines the selected node's availability for additional operations; an input property that determines whether to hide or unhide a socket input of the selected node; and an output property that determines whether to hide or unhide an output socket of the selected node.

In addition, the application may further provide the ability to display a list of nodes in the group at step 708 and to select a particular node from the list of nodes for editing at steps 710.

FIG. 8 illustrates a method for obtaining and working with a custom node in accordance with one or more embodiments of the invention. At step 800, a node is selected in a procedural renderer (i.e., schematic view). As stated above, the node is a graphical representation of a function that affects a clip or another node in the procedural renderer.

At step 802, the selected node is associated with a custom node bin. The custom node bin represents a custom node that can be used in the schematic work area of the procedural renderer as often as desired. Accordingly, the custom node/custom node bin is used in the schematic work area at step 804. Such use may be provided by selection of the custom node bin followed by dragging and dropping the selected custom node bin into the schematic work area. Further, since the custom node bin may be used as often as desired, the same custom node bin may be applied to multiple clips.

As set forth above, the custom node bin may have multiple selected nodes that create an effect. Additionally, the custom node bin may only be available to a current user or may be a project based custom node bin that is available to all users.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for editing a clip of image data in an audio/video processing program comprising:
   (a) receiving, in the audio/video processing program, an input clip of image data;
   (b) performing, in the audio/video processing program, one or more operations on the clip of image data to create and output an output clip;
   (c) displaying, via the audio/video processing program, a schematic view of the processing performed to create the output clip, wherein schematic view comprises a process tree that comprises multiple nodes comprising an input node representing the input clip, an output node representing the output clip, and one or more operator nodes representing the one or more operations;
   (d) selecting, via user input, in the displayed process tree, two or more of the multiple nodes; and
   (e) customizing, based on the user input, a display of the displayed process tree by grouping the two or more selected nodes into a group, wherein:
      (1) each node in the group comprises an input socket for an input connection into the node, and an output socket for an output connection out of the node;
      (2) the display of the input socket and the output socket are color coded, wherein the color is defined by a nature of the socket;
   wherein:
   the group node comprises a compositing node;
   the color of the input socket and the output socket differs depending on whether the input socket or output socket is a front socket, a back socket, a matte socket, or a compositing socket.

2. The method of claim 1 wherein the customizing comprises:
   collapsing the selected nodes into a single group wherein instead of displaying the selected nodes, a group node that comprises a compacted representation of one or more of the selected nodes in the single group is displayed.

3. The method of claim 1 further comprising:
   displaying a menu that provides an ability to modify display properties for the group node based on the user input, wherein the user input comprises a modification of the display properties for the group node; and
   wherein the customizing comprises displaying the displayed process tree based on the modified display properties.

4. The method of claim 3 wherein the display properties comprise:
   a visibility property that determines a selected node's visibility within the group;
   a user interface property that determines the selected node's availability for additional operations;
   an input property that determines whether to hide or unhide the input socket of the selected node; and
   an output property that determines whether to hide or unhide the output socket of the selected node.

5. The method of claim 1 further comprising:
   displaying a list of the nodes in the group; and
   selecting a particular node from the list of nodes for editing.

6. A computer-implemented method for editing a clip of image data in an audio/video processing program comprising:
  (a) receiving, in the audio/video processing program, an input clip of image data;
  (b) performing, in the audio/video processing program, one or more operations on the clip of image data to create and output an output clip;
  (c) displaying, via the audio/video processing program, a schematic view of the processing performed to create the output clip, wherein schematic view comprises a process tree that comprises multiple nodes comprising an input node representing the input clip, an output node representing the output clip, and one or more operator nodes representing the one or more operations;
  (d) selecting, via user input, in the displayed process tree, one or more of the multiple nodes; and
  (e) associating the selected node with a custom node bin, wherein the custom node bin represents a custom node that can be repeatedly used and displayed as a single node in the process tree to perform the one or more operations represented by the one or more selected nodes in the custom node bin, wherein:
    (1) the custom node bin comprises an input socket for an input connection into the node, and an output socket for an output connection out of the node;
    (2) the display of the input socket and the output socket are color coded, wherein the color is defined by a nature of the socket;
  wherein:
  the custom node bin comprises a compositing node;
  the color of the input socket and the output socket differs depending on whether the input socket or output socket is a front socket, a back socket, a matte socket, or a compositing socket.

7. The method of claim 6, wherein the custom node bin comprises multiple selected nodes that create an effect.

8. The method of claim 6, further comprising:
  providing access restrictions for the custom node bin that defines a set of users that can utilize the custom node bin to perform the one or more operations.

9. The method of claim 6, wherein the custom node bin comprises a user custom node that is only available to a current user.

10. The method of claim 6, wherein the custom node bin comprises a project custom node that is available to all users working on a common project.

11. The method of claim 6, further comprising using the custom node by:
  selecting the custom node bin;
  dragging and dropping the selected custom node bin into the process tree.

12. The method of claim 6, wherein the custom node bin is applied to multiple clips.

13. A computer implemented system for editing a clip of image data in an audio/video processing program comprising:
  (a) a computer having a memory;
  (b) an audio/video processing application, executing on the computer, wherein the audio/video processing application is configured to:
    (1) receive an input clip of image data;
    (2) perform one or more operations on the clip of image data to create and output an output clip;
    (3) display a schematic view of the processing performed to create the output clip, wherein schematic view comprises a process tree that comprises multiple nodes comprising an input node representing the input clip, an output node representing the output clip, and one or more operator nodes representing the one or more operations;
    (4) select, via user input, in the displayed process tree, two or more of the multiple nodes; and
    (5) customize, based on the user input, a display of the displayed process tree by grouping the two or more selected nodes into a group, wherein:
      (A) each node in the group comprises an input socket for an input connection into the node, and an output socket for an output connection out of the node;
      (B) the display of the input socket and the output socket are color coded, wherein the color is defined by a nature of the socket;
    wherein:
    the group node comprises a compositing node;
    the color of the input socket and the output socket differs depending on whether the input socket or output socket is a front socket, a back socket, a matte socket, or a compositing socket.

14. The system of claim 13 wherein the application is configured to customize by:
  collapsing the selected nodes into a single group wherein instead of displaying the selected nodes, a group node that comprises a compacted representation of one or more of the selected nodes in the single group is displayed.

15. The system of claim 13 further comprising:
  displaying a menu that provides an ability to modify display properties for the group node based on the user input, wherein the user input comprises a modification of the display properties for the group node; and
  wherein the application is configured to customize by displaying the displayed process tree based on the modified display properties.

16. The system of claim 15 wherein the display properties comprise:
  a visibility property that determines a selected node's visibility within the group;
  a user interface property that determines the selected node's availability for additional operations;
  an input property that determines whether to hide or unhide the input socket of the selected node; and
  an output property that determines whether to hide or unhide the output socket of the selected node.

17. The system of claim 13 wherein the application is further configured to:
  display a list of the nodes in the group; and
  select a particular node from the list of nodes for editing.

18. A computer-implemented system for editing a clip of image data in an audio/video processing program comprising:
  (a) a computer having a memory;
  (b) an audio/video processing application, executing on the computer, wherein the audio/video processing application is configured to:
    (1) receive an input clip of image data;
    (2) perform one or more operations on the clip of image data to create and output an output clip;
    (3) display a schematic view of the processing performed to create the output clip, wherein schematic view comprises a process tree that comprises multiple nodes comprising an input node representing the input clip, an output node representing the output clip, and one or more operator nodes representing the one or more operations;

(4) select, via user input, in the displayed process tree, one or more of the multiple nodes; and
(5) associate the selected node with a custom node bin, wherein the custom node bin represents a custom node that can be repeatedly used and displayed as a single node in the process tree to perform the one or more operations represented by the one or more selected nodes in the custom node bin, wherein:
  (A) the custom node bin comprises an input socket for an input connection into the node, and an output socket for an output connection out of the node;
  (B) the display of the input socket and the output socket are color coded, wherein the color is defined by a nature of the socket;
wherein:
  the custom node bin comprises a compositing node;
  the color of the input socket and the output socket differs depending on whether the input socket or output socket is a front socket, a back socket, a matte socket, or a compositing socket.

19. The system of claim 18, wherein the custom node bin comprises multiple selected nodes that create an effect.

20. The system of claim 18, wherein the application is further configured to:
  provide access restrictions for the custom node bin that defines a set of users that can utilize the custom node bin to perform the one or more operations.

21. The system of claim 18, wherein the custom node bin comprises a user custom node that is only available to a current user.

22. The system of claim 18, wherein the custom node bin comprises a project custom node that is available to all users working on a common project.

23. The system of claim 18, wherein the application is further configured to use the custom node by:
  selecting the custom node bin;
  dragging and dropping the selected custom node bin into the process tree.

24. The system of claim 18, wherein the custom node bin is applied to multiple clips.

* * * * *